TRANSISTOR CONTROLLER

Filed May 9, 1955

INVENTOR.
B. H. PINCKAERS
BY Frederick E. Lange
ATTORNEY

1

2,828,450

TRANSISTOR CONTROLLER

Balthasar H. Pinckaers, Hopkins, Minn., assignor to Minneapolis-Honeywell Regulator Company, Minneapolis, Minn., a corporation of Delaware Application May 9, 1955, Serial No. 507,111

11 Claims. (Cl. 317—148.5)

The present invention relates to a transistor control circuit with a variable differential for use in condition control systems such as, for example, temperature control systems.

An object of this invention is to provide an electronic control system using transistors so as to have a low voltage direct current electronic control system.

Another object of this invention is to provide a low voltage electronic relay control circuit using transistors which has a snap action and which has a variable differential.

Another object of this invention is to provide a low voltage electronic temperature control system using transistors which has a variable control point and a variable differential.

Another object of my invention is to provide a low voltage electronic control system using transistors which is responsive only to changes in a condition.

These and other objects of my invention will become apparent upon consideration of the accompanying specification, claims and drawings, of which:

Figure 1:
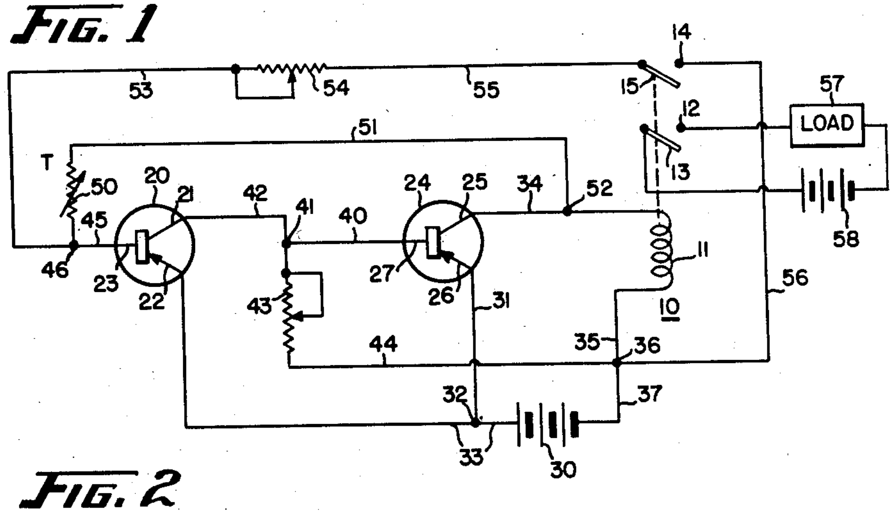
Figure 1 is a schematic diagram of a preferred embodiment of this invention.

Referring now to Figure 1 there is shown a snap acting control circuit having a relay 10 to be controlled. Relay 10 includes a relay winding 11, a first set of relay contacts 12 and 13 and a second set of contacts 14 and 15. The relay is shown in its deenergized position and upon energization of said relay the contact blades 13 and 15 move up to engage contacts 12 and 14 respectively. Relay winding 11 is connected to be energized from a transistor amplifier which includes transistors 20 and 24. Transistor 20 has a collector electrode 21, an emitter electrode 22, and a base electrode 23. Transistor 24 has a collector electrode 25, an emitter electrode 26, and a base electrode 27. The second stage transistor 24 is energized by a source of potential 30, shown as a battery, which has its positive terminal connected to the emitter electrode 26 through conductors 31 and 33. The collector electrode 25 is connected to the negative terminal of battery 30 through a conductor 34, the relay winding 11, a conductor 35, a junction 36, and a conductor 37. Transistor 24 is connected to the output of the previous stage transistor 20 by connecting the base electrode 27 to collector electrode 21 through a conductor 40, a junction 41, and a conductor 42. Collector electrode 21 is also connected to the potential source through the conductor 42, the junction 41, a potentiometer resistor 43, and a conductor 44 which terminates at junction 36. Emitter electrode 22 is connected to the positive terminal of the battery by the conductor 33. Base electrode 23 is connected through a conductor 45, a junction 46, a condition responsive resistance 50, a conductor 51, and through a junction 52 of the conductor 34 to collector 25. The condition responsive resistance 50 may be a

2 temperature responsive resistor, here shown as a negative temperature coefficient resistor, which is mounted in the area to be controlled. Base electrode 23 is also connected through the conductor 45, junction 46, a conductor 53, a potentiometer 54, and a conductor 55 to the movable contact 15 of relay 10. Stationary contact 14 is connected to the negative terminal of battery 30 through a conductor 56, the junction 31 and the conductor 37. Contacts 12 and 13 are connected to complete a circuit to energize a load device 57 from a source of potential 58, here shown as a battery for convenience.

In one satisfactory test of this circuit the values of components used were as follows:

| Reference No. | Item | Value |
|---|---|---|
| 20 | Transistor | 2N34 RCA. |
| 24 | do | 2N6 Honeywell. |
| 43 | Resistance | 3,500 ohms. |
| 54 | do | 600K ohms. |
| 30 | Battery | 28 volts. |
| 10 | Relay | 300 ohm coil. |
| 50 | Sensor | L1215 Keystone-Negative Temperature Coefficient Resistor, 250K ohms @ 70° F., Coeff.=2.5%/degree F. |

OPERATION

In considering the operation of Figure 1 it will be noted that relay 10 is shown in its deenergized position, that is, with the associated contacts open. For explanatory purposes let us assume the temperature of the area being sensed by temperature sensitive resistor 50 is sufficiently high to satisfy the system so that relay 10 remains deenergized. This is the case when transistor 24 is substantially non-conducting. A current path can be traced from the positive terminal of battery 30 through conductor 33 to the emitter 22 of transistor 20, to base electrode 23, conductor 45, junction 46, temperature responsive resistor 50, conductor 51, junction 52, relay winding 11 of relay 10 and conductors 35 and 37 to the negative terminal of battery 30. Since the value of resistance of resistor 50 is relatively high the base current flowing through transistor 20 is comparatively small. Current also flows from source 30, through conductor 33 to emitter 22, from the emitter 22 to the collector 21 of transistor 20, through conductor 42, potentiometer 43, and through conductor 44, junction 36, and conductor 37 to the negative terminal of the battery 30.

Another current path may be traced from source 30 through conductor 33, junction 32, conductor 31, emitter electrode 26 of transistor 24 to the base electrode 27, through conductor 40, junction 41, potentiometer 43, and conductors 44 and 37 to the negative terminal of the source 30. Current also flows from source 30 through conductors 33 and 31 to emitter 26, from emitter to collector 25 of transistor 24, conductor 34, winding 11 of relay 10 and conductors 35 and 37 back to the source 30. The junction transistors are basically current emplifiers so that generally the collector current is larger than the base current by the amplification factor of the transistor.

Temperature sensitive resistor element 50 as shown has a negative temperature coefficient, so that as the temperature decreases in the space being sensed, the resistance element 50 increases in resistance. The increase in the magnitude of resistor 50 has the effect of decreasing the current flowing in the base 23 of transistor 20, which further results in a corresponding decrease in the transistor output current flowing through collector 21. With less current tending to flow through potentiometer 43 the voltage drop across the resistor decreases, making base 27 of transistor 24 slightly more negative with respect to emitter 26. This change in bias of transistor 24 causes more base current to flow, which also increases the output current of the transistor 24, thus increasing the current through the relay winding 11.

As the current through winding 11 increases, the voltage drop across the relay winding increases so that the potential at junction 52 moves in a positive direction. The bias potential applied to base 23 across resistor 50 is thus reduced so that the input current to transistor 20 becomes still smaller, resulting in less conduction of transistor 20 and increased conduction for transistor 24, energizing relay winding 11 still further. The action is regenerative so that output transistor 24 snaps from a state of relative low conduction to a relatively high conduction state and relay 10 is energized sufficiently to pull in, closing contacts 13 and 15 which make electrical contact with contacts 12 and 14 respectively. The relatively high current through transistor 24 and winding 11 results in a high potential drop across the winding 11 since the impedance between emitter and collector of transistor 24 is now relatively low compared to the winding resistance. The bias potential applied to base 23 through temperature responsive resistor 50 is therefore very low and a very small current flows through the resistor 50. If the value of resistor 50 were reduced far enough the base current of transistor 20 would increase to the point where the controller would snap back to the original condition to cut off transistor 24 and deenergize the relay. The differential between pull in and drop out of the relay of this arrangement would be unworkably wide, however, and in this invention an additional bias path is provided for base 23 when the relay is energized.

When contacts 14 and 15 close a current path is completed from base 23 through conductors 45 and 53, differential adjust potentiometer 54, conductor 55, contacts 14 and 15, conductor 56, junction 36 and conductor 37 to the negative terminal of the source 30. By proper adjustment of the wiper of the differential adjustment potentiometer 54, the resultant base current of transistor 20, which current is now the sum of the two bias path currents, can be made to approach the base current flowing just prior to the point at which the relay was energized. Now a slight increase in temperature of the space being measured causing a slight reduction in the value of resistance of resistor 50 will increase the base current of transistor 20 to the point where the system snaps back and the relay becomes deenergized. This process is the reverse of that previously described. As the temperature rises the value of resistor 50 decreases tending to increase the input current to transistor 20. This results in an increasing output current of transistor 20 which increases the potential drop across set point potentiometer 43 and reduces the conduction of transistor 24. As the output current of transistor 24 is reduced, the potential drop across winding 11 of the relay is correspondingly reduced, which increases the bias potential to input transistor 20 across temperature responsive resistor 50. The increasing bias potential tends to increase the base current of transistor 20 increasing the conduction of transistor 20 and reducing still further the conduction of output transistor 24. The action is regenerative and the system snaps to an off position in which the relay is deenergized and the contacts again open.

When the relay is energized contacts 12 and 13 complete a circuit from source 58 to a suitable load device 57, which may, for example, control the heating supplied to the space in which the temperature is being sensed. This then becomes a closed loop control system through the process of controlling the temperature of the space measured.

Adjustment of the wiper of potentiometer 54 changes the temperature differential required between relay pull in and drop out. As the magnitude of potentiometer 54 is increased the differential is widened. Adjustment of potentiometer 43 changes the control point temperature at which the relay 10 becomes energized. As the magnitude of potentiometer 43 is decreased the temperature at which relay pull in occurs is increased.

Figure 2:
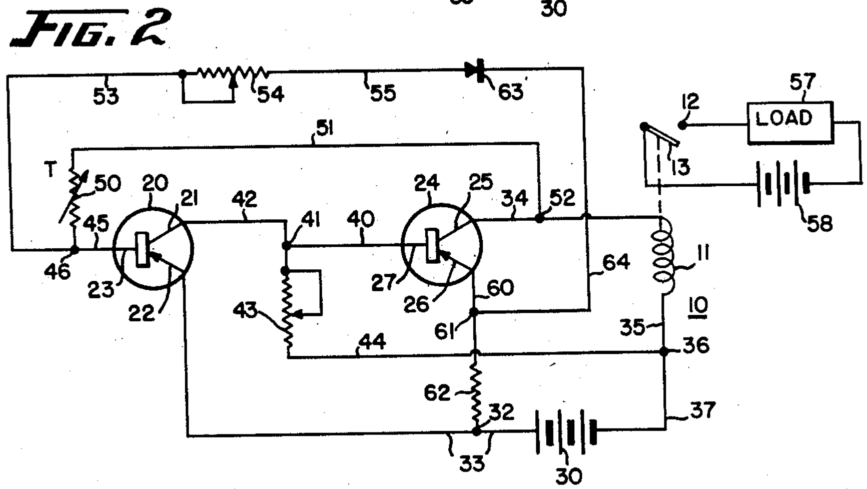
Figure 2 is a modification of Figure 1.

*Figure 2*

In Figure 2, which is a modification of Figure 1, the same numerals have been used for component identification as were used in Figure 1, except at the modified points. The majority of the components and connections of Figure 2 being the same as Figure 1, only the numerals relating to the modification will be discussed. In Figure 2 the emitter 26 of transistor 24 is connected to the positive terminal of source 30 through a conductor 60, a junction 61, a resistor 62, the junction 32, and the conductor 33. The pair of relay contacts 14 and 15 have been eliminated and base 23 of transistor 20 is connected through the conductors 45 and 53, the potentiometer resistor 54, the conductor 55, a rectifier 63, shown here as a semiconductive diode, and a conductor 64 to the junction 61 and thus to emitter 26. In one satisfactory test of the circuit of Figure 2 the following values of components were used:

| Reference No. | Item | Value |
|---|---|---|
| 43 | Resistance | 3,500 ohms. |
| 54 | do | 25K ohms. |
| 62 | do | 22 ohms. |
| 63 | Diode | 1N51. |
| 20 | Transistor | 2N34 RCA. |
| 24 | do | 2N6 Honeywell. |
| 30 | Battery | 28 volts. |
| 10 | Relay | 300 ohm coil. |
| 50 | Sensor | Same as Fig. 1. |

The operation of Figure 2 is similar in most respects to the operation described for Figure 1 and only the differences of operation will be discussed. In Figure 2 the emitter 26 of output transistor 24 is connected to the positive terminal of source 30 through the conductor 60, the junction 61, the resistor 62, the junction 32, and conductor 33. The addition of resistor 62 in the emitter circuit means that as the conduction of transistor 24 increases, the junction 61 becomes increasingly negative. In Figure 2 the relay contacts 14 and 15 have been eliminated and the system differential control circuit connects the base electrode 23 of transistor 20 to the junction 61 between the emitter 26 and resistor 62 through a circuit consisting of conductors 45 and 53, differential adjustment potentiometers 54, conductor 55, a diode rectifier 63, and a conductor 64 to the junction 61. Let us assume again that initially the relay is deenergized. This is the case when the conduction of transistor 24 is maintained substantially cut off. When the conduction of transistor 24 is maintained substantially cut off the potential drop across resistor 62 is relatively low so that the potential at junction 61 is only slightly less positive than the positive terminal of battery 30, and thus essentially none of the base current of transistor 20 flows through the resistor 54 and rectifier 63 to the junction 61, but flows instead through temperature responsive resistor 50. The snap action of this circuit is similar to that of Figure 1; as the magnitude N. T. C. resistor 50 increases the conduction of transistor 20 is decreased and the conduction of transistor 24 begins to increase.

As the output current of transistor 24 increases, the potential at junction 52 moves in a positive direction thus reducing the bias potential applied to base 23 through resistor 50 and thereby reducing the base current still further. The action is regenerative and the system snaps to a condition where output transistor 24 is conducting relatively heavily and the relay becomes energized. When transistor 24 is conducting a substantial amount, the potential drop across resistor 62 becomes appreciable so that the base current of transistor 20 flows through differential adjust potentiometer 54 and diode 63. Adjustment of the wiper of potentiometer 54 varies the differential between relay pull in and drop out.

Figure 3:
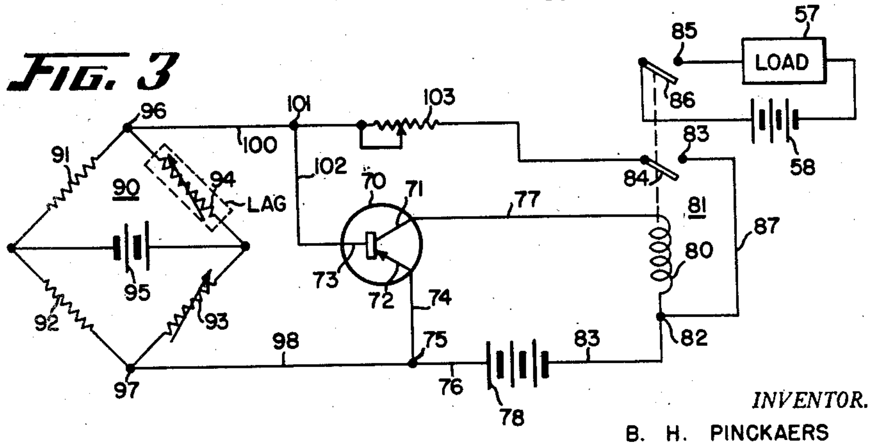
Figure 3 is a schematic diagram of another embodiment of the invention.

*Figure 3*

In Figure 3 there is shown a transistor 70 having a collector 71, an emitter 72 and a base electrode 73. The emitter 72 is connected to the positive terminal of a source of potential shown as a battery 78, through a conductor 74, a junction 75, and a conductor 76. The collector 71 is connected to the negative battery terminal through a conductor 77, a relay winding 80 of a relay 81, a junction 82, and a conductor 83. The relay 81 also has a first set of contacts 83 and 84, and a second set of contacts 85 and 86. A D. C. bridge circuit 90 has four impedance legs 91, 92, 93 and 94. A source of potential 95 is connected to energize the bridge. Impedances 91 and 92 are fixed impedances and impedances 93 and 94 are condition responsive impedances, which herein are described as temperature responsive resistors. Resistors 93 and 94 have similar characteristics except that resistor 94 is designed to have a lagged response so that the response time of resistor 94 to condition changes is slower. An output terminal 97 of the bridge is connected to emitter 72 through a conductor 98, the junction 75, and the conductor 74. An output terminal 96 of the bridge is connected to the base 73 through a conductor 100, a junction 101, and a conductor 102. The junction 101 is connected to movable contact 84 of the relay 81 by a potentiometer 103. Stationary contact 83 is connected to the negative terminal of source 78 through a conductor 87, the junction 82 and the conductor 83. Contacts 85 and 86 when closed act to complete the circuit to energize load device 57. A successful embodiment of Figure 3 utilized the following values of components.

| Reference No. | Item | Value |
|---|---|---|
| 91, 92 | Resistance | 1,000 ohms. |
| 93, 94 | Sensor | N. T. C. resistor, 1,000 ohms @ 70° F., Coeff. 2.5%/degree F. |
| 95 | Battery | 10 volts. |
| 70 | Transistor | 2N57 Honeywell. |
| 103 | Potentiometer | 0-50K ohms. |
| 81 | Relay | 300 ohm coil. |

The circuit of Figure 3 responds to a relatively rapidly changing condition to control a relay. The resistance bridge 90 is energized by a source of direct current 95.

Condition responsive resistors 93 and 94 are mounted in the area wherein the condition is to be sensed. As previously stated, the resistors 93 and 94 preferably have identical characteristics except that resistor 94 has more inherent lag and does not respond as quickly to changes of the condition being sensed as does resistor 93. The change in magnitudes of resistors 93 and 94 per unit change of the condition sensed are equal, however, resistor 94 lags behind resistor 93 in responding to the condition change. The output terminals 96 and 97 of the bridge 90 are connected to the base 73 and emitter 72 respectively of transistor 70 to provide a control current for the transistor. The output of the transistor is connected to energize the load device shown as relay 81 when a proper bias is applied to the input terminals of the transistor. Let us assume for purposes of explanation that the relay 81 is deenergized and that the condition being sensed has been stable for a time so that bridge 90 is balanced and the potential difference between bridge output terminals 96 and 97 is zero. As the condition changes, in this case as the temperature rises, temperature sensitive resistor 93 responds relatively rapidly and decreases in magnitude. The bridge 90 becomes unbalanced so that terminal 96 becomes negative with respect to terminal 97 and transistor 70 is thereby biased to conduct more current. As the current flow through transistor 70 is increased the current through relay winding 80 is increased so that relay 81 is actuated and the contacts pull in. When the relay pulls in, contacts 85 and 86 complete the circuit to energize a suitable load device 57. After a time the lagged resistor 94 approaches the same value as resistor 93 in response to the change of temperature, and the unbalance of the bridge decreases to a null when the magnitude of resistor 94 again becoms equal to resistor 93. Thus it is apparent that the circuit is only responsive to a relatively rapid change of condition. At this point the bias supplied to the transistor from the bridge becomes zero so in order to maintain the relay energized an auxiliary bias path is supplied when relay 81 is energized. The negative terminal of source 78 is connected to base 73 through conductors 83 and 87, relay contact 83, movable contact 84, potentiometer 103, junction 101 and conductor 102. The wiper of potentiometer 103 may be set at any desired value to control the state of conduction of the transistor at a desired value when the bias from bridge 90 is zero. Now let us assume that the temperature drops in the space being sensed. Temperature responsive resistor 93 responding relatively rapidly becomes larger in magnitude, the bridge 90 again becomes unbalanced, but this time in the opposite direction so that terminal 96 becomes positive with respect to terminal 97. This bias acts in opposition to the bias flowing through potentiometer 103 and relay contacts 83 and 84, and the transistor current conduction is thereby reduced so that relay 81 is deenergized. When the relay is deenergized the contacts 84 and 83 open and the bias to the transistor is again supplied only from bridge 90 to keep the transistor cut off. After a time the resistor 94 equalizes in value with resistor 93 and zero bias is applied to the transistor to maintain it relatively cut off.

In general, while I have shown certain specific embodiments of my invention, it is to be understood that this is for the purposes of illustration and that my invention is to be limited solely by the scope of the appended claims.

I claim as my invention:

1. Condition control apparatus comprising: electrical amplifying means including at least one transistor, each transistor having a plurality of electrodes including input and output electrodes; condition responsive variable impedance means connected to the input electrodes of said transistor means and to a source of potential to provide an input current path for said transistor means; current actuated controlled means connected to said output electrodes; further impedance means; and circuit means connecting said further impedance means to said input electrodes and to a junction point in the output circuit, said junction point having a potential applied thereto upon energization of said current actuated controlled means such that an additional source of input current is supplied to said input electrodes upon energization of said controlled means.

2. Condition control apparatus comprising: transistor amplifier means having input and output terminals, said means including a transistor having a semiconductor body and a plurality of output and input electrodes including a collector electrode, a base electrode and an emitter electrode making contact with said body; means connecting said input and output electrodes to said input and output terminals, respectively; a source of direct current potential having a first and a second terminal; output means including relay means connecting a first of said output terminals to the first terminal of said source of potential and connecting the other of said output terminals to the second terminal of said source of potential; input signal producing means connected to said amplifier input terminals in controlling relation thereto, said means including condition responsive variable impedance means responsive to a change of condition to vary the input signal applied to said transistor amplifier means; means connecting a first of said input terminals to said second terminal of said source; further impedance means connected intermediate the second input terminal and said output means, the energization of said output means providing a potential to said further impedance means so that additional input current is applied to said amplifier means.

3. Temperature control apparatus comprising; transistor amplifier means having input and output terminals, said means comprising a transistor having a plurality of electrodes including an emitter, a collector, and a base electrode; means connecting said emitter and base electrode to said input terminals and connecting said collector electrode and one of said other electrodes to said output terminals; a source of potential having a pair of terminals; output means including relay means connecting a first of said output terminals to a first terminal of said source; input signal current producing means connected to a first of said input terminals; temperature responsive impedance means in said input signal producing means which impedance means varies in magnitude with temperature changes to vary the input signal current to said transistor amplifier means; further impedance means; means connecting the second terminal of said source to the second output and the second input terminal; circuit means connecting said further impedance means intermediate said first input terminal and said output means whereby a potential is applied to said further impedance means only upon the energization of said output means thereby supplying additional input current to said amplifier means.

4. Condition control apparatus comprising: transistor amplifying means having input and output terminals, said transistor amplifying means comprising at least one transistor having a plurality of electrodes including a collector, an emitter, and a base electrode; means connecting said emitter and base electrodes to said input terminals and connecting said collector and one of the other of said electrodes to said output terminals; a source of direct potential having first and second terminals; relay means having an actuating winding and a plurality of contact pairs; circuit means connecting said relay winding and said source intermediate said amplifier output terminals, said amplifying means being energizable to actuate said relay means; condition responsive variable impedance means connected in current controlling relation to said amplifying means, said impedance means being connected from a first of said input terminals to said first source terminal through said relay winding, said condition responsive impedance means providing a bias current path for said amplifying means and controlling the operation of said amplifying means in response to a condition so that upon reaching a given condition said relay means becomes energized by said amplifying means; adjustable impedance means; and circuit means including normally open contacts of said relay means connecting said adjustable impedance means from said first input terminal to said first source terminal, so that upon energization of said relay means said contacts close and complete said circuit, thereby providing an auxiliary bias current path while said relay means is energized.

5. Temperature control apparatus comprising: temperature responsive impedance means mounted in an area where temperature is to be sensed; transistor amplifying means including at least a first and a second transistor, each of said transistors having a collector, an emitter and a base electrode; a source of direct potential having a first and second terminal; relay means having an actuating winding and a plurality of contacts; means connecting said emitter electrodes to said first terminal of said source; means connecting said collector electrode of said second transistor to said second terminal of said source through said relay winding said amplifying means being in current controlling relation to said relay means; further conductive means connecting said base electrode of said first transistor to said second terminal of said source through said temperature responsive impedance means and said relay winding providing a first signal current path for said first transistor the magnitude of said signal current being determined by said temperature responsive impedance means; conductive means connecting said first transistor in current controlling relation to said second transistor; adjustable impedance means; circuit means including said adjustable impedance means and normally open contacts of said relay means, connecting said first base electrode to said second terminal of said source thereby providing an auxiliary bias current path for said transistor when said relay means becomes energized closing said contacts; and temperature controlling means energized by second contacts on said relay means upon energization of said relay means.

6. Condition control apparatus comprising: transistor amplifying means having a plurality of electrodes including a collector, an emitter, and a base electrode; a source of direct potential for energizing said amplifying means having first and second terminals; first impedance means connecting said emitter to said first terminal; current actuated means connecting said collector electrode to said second terminal, said current actuated means being energized proportional to the conductivity of said amplifier means; condition responsive variable impedance means; input circuit means including said condition responsive impedance means and said current actuated means connecting said base electrode to said second terminal of said source, providing a signal current path for said amplifying means, said condition responsive impedance means controlling the conductivity of said amplifying means in accordance with said condition; adjustable impedance means; asymmetrically conducting means; and circuit means including in series said adjustable impedance means, said asymmetrical conducting means, and said first impedance means, connecting said base electrode to said first terminal providing an auxiliary signal current path for said amplifying means when said current actuated means is energized.

7. Condition control apparatus comprising; transistor amplifying means having a plurality of electrodes including a collector, an emitter, and a base electrode; a source of direct potential having first and second terminals; transistor input terminals comprising said base and emitter electrodes, and output terminals comprising said collector electrode and one of the other of said electrodes; signal current producing means having output terminals; condition responsive variable impedance means in said signal current producing means, the magnitude of said impedance means being variable in response to said condition thereby producing an output signal of reversible sense from said signal producing means dependent upon the direction of change of said condition; means connecting said output terminals of said signal producing means to said input terminals of said amplifying means in current controlling relation thereto; relay means having an actuating winding and a plurality of contacts including a set of normally open contacts; circuit means connecting said source of potential and said relay means in circuit with said output terminals of said amplifying means thereby energizing said amplifier means, the conductivity of said amplifying means controlling the energization of said relay means; further impedance means; circuit means including in series said further impedance means, said amplifier input terminals and said normally open relay contacts connected intermediate said first and second terminals of said source providing a source of bias current to said transistor amplifier upon energization of said relay means.

8. Condition control apparatus comprising; transistor amplifying means including first and second transistors, said transistors having a plurality of electrodes including input and output electrodes; a source of direct potential having first and second terminals; condition responsive impedance means, the impedance of said means changing in proportion to the change of a condition; relay means having an actuating winding and a plurality of contacts; output circuit means comprising said actuating winding connecting said second transistor output electrodes intermediate said source of potential terminals thereby energizing said second transistor; biasing means connecting said condition responsive impedance means from a first of said input electrodes of said first transistor to said relay winding whereby the potential applied to said condition responsive means varies inversely with the energization of said relay means; means connecting said first transistor in current controlling relation to said second transistor so that changes of said condition responsive device in response to condition changes varies the energization of said relay means; and differential control means comprising adjustable impedance means connected to said first input electrode of said first transistor and said output means, said differential control means becoming effective when said relay means is energized by the conduction of said second transistor.

9. Condition control apparatus comprising; amplifier means comprising transistor means having a plurality of electrodes including a collector, an emitter and a base electrode; amplifier input terminals connected to said base and emitter electrodes; amplifier output terminals, one being connected to said collector electrode and the other being common with one of said input terminals; a source of potential connected to said output terminals to energize said amplifier means; relay means having a winding and a plurality of contacts including a set of normally open contacts, said winding connected to and energized by the output circuit of said amplifier means; condition responsive impedance means, the impedance of said means varying with a change in said condition, connected intermediate the input circuit of said amplifier means and a source of potential thereby controlling the input signal bias applied to said amplifier means in proportion to said condition; and circuit means including adjustable impedance means and said normally open relay contacts connected intermediate said input circuit and a source of potential and effective upon energization of said relay means to change the bias applied to said amplifier means.

10. Transistor control apparatus comprising; first and second transistor means, each of said transistors having collector, base and emitter electrodes, the input circuit of each of said transistor means comprising base and emitter electrodes, the output circuit of said transistor means comprising said collector electrode and one of said input electrodes; condition responsive impedance means, the magnitude of said impedance being proportional to a condition; means connecting said condition responsive means in said input circuit of said first transistor means in current controlling relation thereof; a source of potential connected to said transistor electrodes for energizing said transistor means; actuating output means; circuit means connecting said output means to the output circuit of said second transistor means, said output means being energized in proportion to the conduction of said transistor means; regenerative variable potential producing means connected from said output means to said input circuit of said first transistor means, so that upon condition changes tending to energize said output means said regenerative means provides a potential to said input tending to aid said energization; differential reducing means connected to said input circuit of said first transistor means; and further means energizing said differential reducing means only upon energization of said output means.

11. Transistor control apparatus comprising; transistor amplifying means, said transistor means comprising a plurality of electrodes including input and output electrodes; a source of potential connected to said amplifying means for energizing said amplifying means; condition responsive means, said means being connected in controlling relation to said input electrodes, said condition responsive means varying with said condition to control the conduction of said amplifier means in accordance with said condition; energizable output means connected to said output electrodes and energized by said amplifying means in accordance with said condition; regenerative signal feedback means connected from said output means to said input electrodes providing a feedback current to supplement said change of condition; differential control means connected to said input circuit; and circuit means in said output means energizing said differential control means only upon energization of said output means in a manner to oppose said change of condition to narrow said operating differential.

References Cited in the file of this patent

UNITED STATES PATENTS

| | | |
|---|---|---|
| 2,050,059 | Koch | Aug. 4, 1936 |
| 2,533,001 | Eberhard | Dec. 5, 1950 |
| 2,569,345 | Shea | Sept. 25, 1951 |
| 2,588,925 | Hecht | Mar. 11, 1952 |